US009014880B2

(12) United States Patent
Durling et al.

(10) Patent No.: US 9,014,880 B2
(45) Date of Patent: Apr. 21, 2015

(54) TRAJECTORY BASED SENSE AND AVOID

(75) Inventors: Michael Richard Durling, Saratoga Springs, NY (US); Harold Woodruff Tomlinson, Jr., Ballston Spa, NY (US); Nikita Visnevski, Niskayuna, NY (US); Craig Alan Hoover, Grand Rapids, MI (US); Glenn Alan Forman, Niskayuna, NY (US); Thomas Baby Sebastian, Niskayuna, NY (US); Mauricio Castillo-Effen, Rexford, NY (US); Steven Richard Hansen, Gaithersburg, MD (US); Douglas Stuart Abernathy, Aledo, TX (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/975,164

(22) Filed: Dec. 21, 2010

(65) Prior Publication Data

US 2012/0158219 A1    Jun. 21, 2012

(51) Int. Cl.
G05D 1/02 (2006.01)
G08G 5/04 (2006.01)
G08G 5/00 (2006.01)
G01S 5/00 (2006.01)
G01S 13/93 (2006.01)

(52) U.S. Cl.
CPC ........... *G01S 5/0072* (2013.01); *G08G 5/0013* (2013.01); *G08G 5/045* (2013.01); *G08G 5/0008* (2013.01); *G01S 13/9303* (2013.01)

(58) Field of Classification Search
USPC ........................................ 342/29
See application file for complete search history.

(56) References Cited

U.S. PATENT DOCUMENTS

| 6,144,915 | A  | * | 11/2000 | Shiomi et al. | 701/120 |
|-----------|----|---|---------|--------------|---------|
| 6,314,366 | B1 | * | 11/2001 | Farmakis et al. | 701/482 |
| 6,714,213 | B1 | * | 3/2004  | Lithicum et al. | 715/701 |
| 6,727,841 | B1 | * | 4/2004  | Mitra | 342/25 R |
| 6,738,694 | B2 | * | 5/2004  | Koncelik, Jr. | 701/2 |
| 6,804,607 | B1 | * | 10/2004 | Wood | 701/301 |
| 7,269,513 | B2 | * | 9/2007  | Herwitz | 701/301 |
| 7,307,579 | B2 | * | 12/2007 | Rees et al. | 342/29 |
| 7,463,890 | B2 | * | 12/2008 | Herz et al. | 455/445 |
| 7,737,878 | B2 | * | 6/2010  | van Tooren et al. | 342/29 |
| 7,747,364 | B2 | * | 6/2010  | Roy et al. | 701/28 |
| 8,229,163 | B2 | * | 7/2012  | Coleman et al. | 382/103 |
| 8,744,737 | B2 | * | 6/2014  | D'Angelo | 701/120 |
| 2002/0080059 | A1 | * | 6/2002 | Tran | 342/29 |
| 2005/0007272 | A1 | * | 1/2005 | Smith et al. | 342/189 |
| 2006/0041345 | A1 | * | 2/2006 | Metcalf | 701/33 |
| 2006/0167599 | A1 | * | 7/2006 | Bodin et al. | 701/16 |
| 2006/0253254 | A1 | * | 11/2006 | Herwitz | 701/301 |
| 2007/0210953 | A1 | * | 9/2007 | Abraham et al. | 342/29 |
| 2007/0222665 | A1 | * | 9/2007 | Koeneman | 342/29 |
| 2007/0240953 | A1 | * | 10/2007 | Marathe | 192/3.28 |
| 2008/0027647 | A1 | * | 1/2008 | Ansell et al. | 701/301 |
| 2008/0033604 | A1 | * | 2/2008 | Margolin | 701/2 |
| 2008/0055149 | A1 | * | 3/2008 | Rees et al. | 342/29 |

(Continued)

*Primary Examiner* — John R Olszewski
*Assistant Examiner* — Jean-Paul Cass
(74) *Attorney, Agent, or Firm* — Fletcher Yoder, P.C.

(57) ABSTRACT

A trajectory-based sense-and-avoid system for use on an aircraft is provided that utilizes 4-D constructs, such as 4-D trajectories or 4-D polytopes, to maintain separation from other aircraft and/or to avoid collisions with other aircraft. In certain embodiments the trajectory-based sense-and-avoid system utilizes 4-D trajectories provided from an external source and/or 4-D trajectories estimated based on a variety of data sources during operation.

21 Claims, 6 Drawing Sheets

(56) References Cited

U.S. PATENT DOCUMENTS

| | | | |
|---|---|---|---|
| 2008/0306691 A1* | 12/2008 | Louis et al. | 701/301 |
| 2009/0088972 A1* | 4/2009 | Bushnell | 701/210 |
| 2009/0273503 A1* | 11/2009 | Rowlan | 342/29 |
| 2010/0027841 A1* | 2/2010 | Sebastian et al. | 382/103 |
| 2010/0292871 A1* | 11/2010 | Schultz et al. | 701/3 |
| 2010/0306001 A1* | 12/2010 | Discenzo et al. | 705/7 |
| 2011/0153205 A1* | 6/2011 | Stimac et al. | 701/207 |
| 2011/0153211 A1* | 6/2011 | Stimac et al. | 701/300 |
| 2013/0176163 A1* | 7/2013 | Margolin | 342/118 |
| 2014/0002293 A1* | 1/2014 | Behrens et al. | 342/36 |
| 2014/0062753 A1* | 3/2014 | Grooters et al. | 342/21 |

\* cited by examiner

TRAJECTORY BASED SENSE AND AVOID

BACKGROUND OF THE INVENTION

The subject matter disclosed herein relates to collision prediction and avoidance in aircraft, such as an unmanned aerial systems or a manned craft flying with a reduced crew.

Unmanned aerial systems (UASs) are systems that include an aerial vehicle that can be piloted from the ground (i.e., remotely) and/or that fly more or less autonomously (i.e., without direct human control or oversight). The UAS may also consist of a ground control station and one or several such aircraft that communicate with and are controlled by the ground control station. The airborne component of such systems can range in size from grams to tons and are set to become more prevalent in the aerospace domain. Civilian uses may include such functions as agricultural crop spraying, electrical power line checking, atmospheric research, data-link relay, and traffic/security surveillance.

Removing the pilot provides the UAS platform designer with additional freedom in terms of maneuver performance, size, payload and endurance constraints when compared with manned aircraft. Further, UASs are generally considered to offer benefits both in survivability and expendability, as well as being cost effective. Thus, UASs offer the opportunity to perform high risk, dangerous and monotonous missions autonomously or with substantially reduced manpower.

However, despite these benefits, there are several challenges concerning the operation and integration of UASs into regulated or commercial airspace; these include safety and reliability, as well as cost and regulations. One safety challenge facing UASs is the ability to sense and detect other airborne craft, thereby avoiding mid-air collisions. Conceptually, collision avoidance can be divided into separation assurance and collision avoidance. Separation management is usually achieved through procedural rules and air traffic control instructions. Collision avoidance is needed in cases of inadequate separation. Collision avoidance may rely, traditionally, on a pilot's ability to "see and avoid" and may also rely on cooperative technologies such as Traffic Collision Avoidance System (TCAS), and Automatic Dependent Surveillance-Broadcast (ADS-B). However, UAS can not depend exclusively on TCAS and ADS-B systems, since there will be airspace users that are not equipped with these systems (i.e., are not cooperative). Therefore, there is a need for systems and/or measures that would allow a UAS to maintain adequate separation from other airborne craft and to implement avoidance measures when adequate separation is lost.

BRIEF DESCRIPTION OF THE INVENTION

In one embodiment, a sense-and-avoid system is provided. The sense-and-avoid system includes a conflict detection module configured to receive a four-dimensional (4-D, i.e., three-spatial dimensions plus one temporal dimension) trajectory of an aircraft and 4-D constructs representing trajectories of other aircraft or regions from which the aircraft is to maintain separation. The conflict detection module determines if a conflict exists between the 4-D trajectory of the aircraft and the 4-D constructs. The sense-and-avoid system also includes a conflict resolution module configured to receive information from the conflict detection module. The conflict resolution module generates a change to the 4-D trajectory of the aircraft to avoid the conflict.

In a further embodiment, a sense-and-avoid system installed on an aircraft is provided. The sense-and-avoid system includes one or more communication links configured to communicate with one or more of a ground control station, an air traffic control system, or other aircraft. The sense-and-avoid system also includes: a sensor suite; a trajectory predictor module configured to generate four-dimensional (4-D) constructs based on the data received from the one or more communication links or the sensor suite; and a flight management system comprising a trajectory planning module and a trajectory prediction module. The trajectory prediction module generates a 4-D trajectory for the aircraft. The sense-and-avoid system also includes: a flight control system in communication with the flight management system and configured to execute instructions from the flight management system to cause the aircraft to fly along the 4-D trajectory; a conflict detection module configured to evaluate the 4-D trajectory for the aircraft and the 4-D constructs generated by the trajectory predictor module or 4-D constructs provided by one or more of the ground control station or the air traffic control system to determine the presence of a conflict between the 4-D trajectory and one or more of the 4-D constructs; and a conflict resolution module configured to generate a change to the 4-D trajectory in the event of a conflict and to communicate the change to the flight management system to update the 4-D trajectory to alleviate the conflict.

In an additional embodiment, an aircraft is provided. The aircraft includes a trajectory-based sense-and-avoid system configured to detect potential conflicts or collisions based on 4-D trajectories or constructs. Potential conflicts or collisions estimated to occur in a strategic time frame are identified using a 4-D trajectory of the aircraft generated by a flight management system of the aircraft and 4-D constructs provided by a source external to the aircraft. Potential conflicts or collisions estimated to occur in a tactical time frame are identified using the 4-D trajectory of the aircraft generated by the flight management system of the aircraft and 4-D constructs, some of which are generated at least in part by a predictor module on-board the aircraft. Potential conflicts or collisions estimated to occur in a critical time frame are identified based at least in part on data generated by an on-board sensor suite.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, each example or embodiment is provided to facilitate explanation of certain aspects of the invention and should not be interpreted as limiting the scope of the invention. In fact, it will be apparent to those skilled in the art that various modifications and variations can be made in the present invention without departing from the scope or spirit of the invention. For instance, features illustrated or described as part of one embodiment or example can be used with another embodiment or example to yield a still further embodiment. Thus, it is intended that the present disclosure covers such modifications and variations as come within the scope of the appended claims and their equivalents.

The present disclosure relates to a sense-and-avoid system for use in an aircraft, such as an aircraft of an unmanned aerial system (UAS). The sense-and-avoid system has access to and utilizes information from multiple sources (e.g., a ground controller, air traffic control systems, on-board sensors, transponder information communicated directly from other aircraft, and so forth). In particular, in certain embodiments, the sense-and-avoid system utilizes the available information to generate four-dimensional trajectories for the aircraft and for all other known aircraft or conditions (e.g., weather hazards, restricted airspace, communication dead zones, and so forth). Based on the four-dimensional (4-D) trajectories, the sense-and-avoid system controls the aircraft so as to maintain suitable separation from other aircraft and/or known conditions or, if separation is lost, to avoid the aircraft or conditions. As will be appreciated, though the present discussion focuses primarily on UASs, in other embodiments, the approaches discussed herein may be applied to manned aircraft as well, such as manned aircraft operating with a reduced crew (e.g., a single pilot) or operating for extended periods on auto-pilot.

Figure 1:
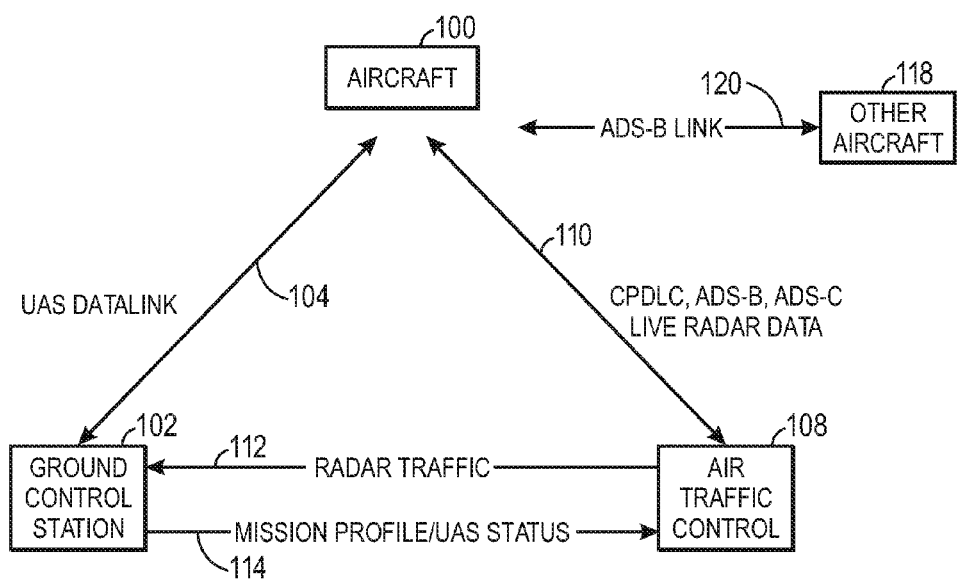
FIG. 1 depicts communications links that may exist between an aircraft and other aircraft or ground-based entities, in accordance with aspects of the present disclosure.

With the preceding comments in mind, and turning to FIG. 1, a diagram depicting an aircraft 100 and other entities in communication with the aircraft 100 are illustrated. In an embodiment where the aircraft 100 is the airborne component of a UAS, one such entity may be a ground control station 102 communicating with the aircraft 100 via a datalink 104 by which instructions (such as flight instructions or remote commands) are sent to the aircraft 100 and by which information or data (such as video or other sensor data, position data, and/or flight and avionics data) is sent from the aircraft 100 to the ground control station 102. The ground control station 102 may control one or more than one aircraft 100 at a time.

The aircraft 100 may also be in communication with an air traffic control system 108. The air traffic control system 108 may provide the aircraft 100 with information about other aircraft being tracked by the air traffic control system 108 via datalink 110. The aircraft 100 may communicate position data and/or flight and avionics data to the air traffic control system 108 via the datalink 110. In addition, the air traffic control system 108 may communicate other types of information to the aircraft 100, such as other aircraft's intent or trajectory information, weather advisories and/or information about restricted airspace, that may be relevant to establishing a course for the aircraft 100.

In the depicted implementation, the air traffic control system 108 and the ground control station 102 are also in communication with one another. In such instances, the air traffic control system 108 may provide the ground control station 102 with information about aircraft tracked by the air traffic control system 108 via the datalink 112. In this manner, if communication is lost between the air traffic control system 108 and the aircraft 100, some or all of the information normally obtained from the air traffic control system 108 may be obtained via the ground control station 102. Likewise, in the depicted embodiment the ground control station 102 may communicate data to the air traffic control system 108 via datalink 14. Examples of such data may include, but are not limited to, a flight plan or mission profile associated with the aircraft 100 and/or a status of the aircraft 100.

In addition, the aircraft 100 may communicate directly with other aircraft 118 in communication range. For example, to the extent that the aircraft 100 and/or the other aircraft 118 are equipped with Traffic and Collision Avoidance Systems (TCAS) and/or Automatic Dependent Surveillance-Broadcast (ADS-B) systems, such systems may communicate directly between the aircraft (such as via datalink 120) to provide information about each aircrafts respective, speed, position, altitude, and/or projected course (i.e., intent communications). Typically, in the case of TCAS and ADS-B systems, both aircraft in question must be equipped with the system in question. In certain embodiments, both aircraft may be equipped with a system (e.g., TCAS or ADS-B) that allows coordinated response between the aircraft. In other embodiments only one of the aircraft may be so equipped, though the other aircraft may be capable of transmitting limited position or intent information. In such an embodiment, the more capable aircraft (such as a TCAS equipped aircraft) may unilaterally use such whatever information is provided by the less capable aircraft in directing the more capable aircraft. As used herein, aircraft equipped with TCAS, ADS-B, or similar systems are referred to as cooperative, while aircraft not equipped with TCAS, ADS-B, or a similar system are referred to as non-cooperative.

While a ground control station 102, an air traffic control system 108, and/or other aircraft 118 all represent possible sources of information for aircraft 100, the aircraft 100 may also have on-board sources of information that may be used for sense-and-avoid operations. For example, the aircraft 100 may be equipped with an on-board sensor suite such as radar, ladar, infrared (IR), and/or video systems that may be used to ascertain the proximity or other aircraft, such as non-cooperative aircraft, that might otherwise go undetected. In certain embodiments, operation or monitoring of the on-board sensors may be enhanced by one or more suitable algorithms that facilitate early obstacle detection and sensing. Likewise, in certain implementations, blind spots, if any, and/or limited range for on-board sensor packages may be addressed by extending the range of the sensors to form a virtual sensor range that covers known blind spots and/or extends the sensor range of the existing coverage volumes.

With the foregoing sources of information in mind, a present embodiment of a sense-and-avoid system utilizes or fuses some or all of the available data from these sources to achieve the desired sense-and-avoid functionality. For example, in certain implementations four-dimensional (three dimensions in space and one dimension in time) constructs (e.g., 4-D trajectories or 4-D polytopes) are derived for other aircraft or for regions of interest (i.e., regions of inclement weather, areas exhibiting poor or limited communication quality, and/or restricted airspace) based some or all of the combined information obtained from the on-board sensor suite, from other aircraft 118, from a ground control station 102 (if applicable), and/or from an air traffic control system 108. A 4-D trajectory may be computed for the aircraft 100 as well using an on-board flight management system provided with such trajectory projection functionality. An example of such a flight management system includes certain of the flight management systems available from General Electric Company.

In this manner, the sense-and-avoid system of an aircraft 100 obtains situational awareness of all other aircraft or relevant conditions within the relevant airspace. The 4-D trajectories or polytopes may be evaluated for potential conflicts (i.e., conflict probed) and course changes or corrections made for the aircraft 100 based on this evaluation. In one embodiment, as discussed herein, a sense-and-avoid system uses a conflict probe approach and algorithms that are accepted for use with air traffic management systems (such as ground-based) air traffic management systems. By way of example, one such conflict probe function is found within the En Route Automation Modernization (ERAM) system available from Lockheed Martin Corporation.

Such trajectory-based sense-and-avoid approaches may enable an aircraft 100 to sense-and-avoid collisions and to provide self-separation from other craft, inclement, weather, and/or restricted airspace. In certain implementations, a trajectory-based sense-and-avoid system, as discussed herein takes into consideration some or all of: the accuracy of the sensor(s) detecting the aircraft in potential conflict, the flight dynamics of both aircraft, the accuracy and/or latency associated with the navigation system of the aircraft, and/or the collision avoidance logic. In one embodiment, a trajectory-based sense-and-avoid system utilizes a collision predicting conflict probe to identify potential threats and then utilizes the trajectory generation capability from an onboard flight management system (FMS) to create a new trajectory that avoids the predicted conflict.

Figure 2:
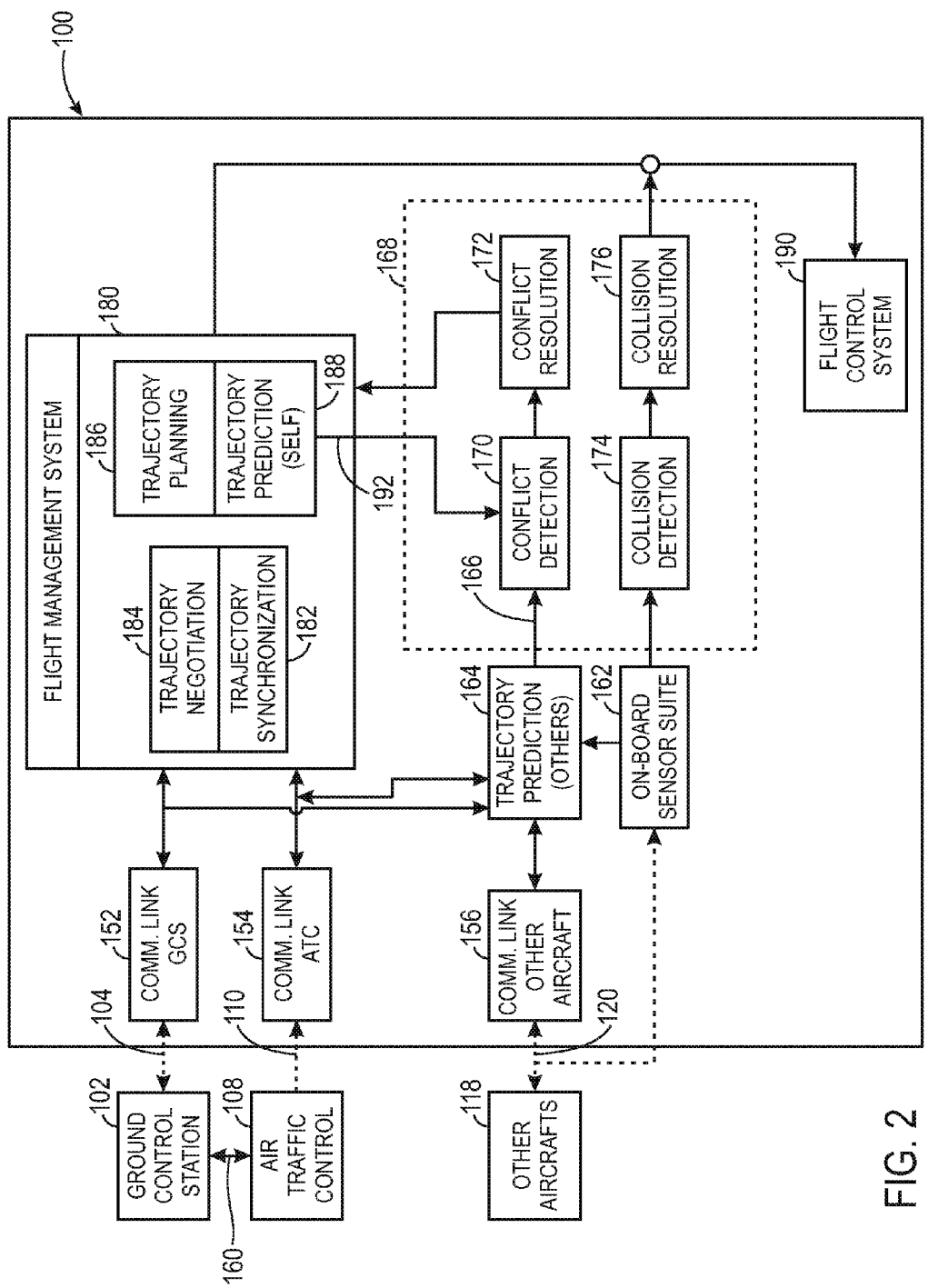
FIG. 2 depicts a trajectory-based sense-and-avoid system, in accordance with aspects of the present disclosure.

Features of one embodiment of an on-board trajectory-based sense-and-avoid system suitable for installation on an aircraft 100 are depicted in FIG. 2. In this example the trajectory-based sense-and-avoid system includes a variety of communication links or circuits for communicating with ground-based entities and other aircraft, as discussed above. For example, in the case of a UAS the trajectory-based sense-and-avoid system may include a communication link 152 with a ground control station 102. This communication link 152 may be used to transfer commands from the ground control station 102 to the aircraft 100 and to relay information back to the ground control station 102.

Likewise, a communication link 154 may be provided between the aircraft 100 and an air traffic control system 108. This communication link 154 may allow air traffic control 108 to perform trajectory management via trajectory synchronization and trajectory negotiation. Other forms of tactical air traffic control are also possible via link 154. For example, air traffic control 108 could also transmit vectoring information through the link 154. Likewise, other types of information, such as weather advisories or information about regions of restricted air space, may also be communicated to the aircraft 100 via the communication link 154 (or via communication link 152 in other embodiments).

In addition, in embodiments where the aircraft 100 is equipped with a TCAS or ADS-B system, a communication link 156 may be provided between the aircraft 100 and other aircraft 118 operating respective TCAS or ADS-B systems (i.e., between cooperative aircraft). In such embodiments, the aircraft 100 may be able to receive information from and to transmit information to the other aircraft 118, including manned aircraft. For instance, if the aircraft 100 is equipped with an ADS-B transponder, it would obtain surveillance information from nearby traffic via the transponder. In one embodiment, all forms of cooperating aircraft communicate with the aircraft 100 through the communication link 156 for the purposes of separation management and collision avoidance.

Further, as noted above, a ground control station 102 (where applicable) and air traffic control 108 may communicate with one another, such as via link 160. The link 160, may make air traffic information provided by air traffic control 108 available to the ground control station 102. If the ground control station 102 receives sufficient information about the surrounding traffic, the ground control station 102 can relay this information to a UAS in cases of loss of link between the UAS and air traffic control 108. In addition, mission profile and flight plan information may be relayed to air traffic control 108 from the ground control station 102 prior to departure.

In the depicted embodiment, the trajectory-based sense-and-avoid system also includes or communicates with an on-board sensor suite 162. The on-board sensor suite 162 may include a set of sensors with complementary sensing modalities which provide the aircraft 100 with the see-and-avoid capability that human pilots possess. However, unlike see-and-avoid contexts, the sensors may also help in finding intruder aircraft or other conflicts in conditions that do not qualify as visual flight conditions. Example of sensors that may be included in an on-board sensor suite 162 include radar, ladar, infrared (IR), and/or video systems.

The depicted example of a trajectory-based sense-and-avoid system also includes a trajectory prediction module 164 which receives inputs from one or more of the above communications links as well as the on-board sensor suite 162. The trajectory prediction module 164 may be implemented as one or more suitable algorithms, implemented via software and/or hardware, which accept input data from one or more of the communication links and/or the on-board sensor suite 162 and which output 4-D constructs 166 such as 4-D trajectory projections for the sensed or known aircraft in the vicinity of the aircraft 100, including information about the uncertainty associated with the predictions.

For example, in one embodiment the trajectory prediction module 164 may be provided as a sensor fusion element which obtains its inputs from several sources. For example, the trajectory prediction module 164 may combine the explicit conflict information obtained via external communication links 152, 154, 156 as well as information derived via own sensor suite 162 to predict the evolution of the position and shape of three-dimensional constructs over time. One of the 4-D constructs 166 that this module generates is the predicted 4-D trajectory of other aircraft sharing the same airspace with the aircraft 100. In addition, other 4-D predicted constructs 166 may correspond to other sources of conflicts that the aircraft 100 needs to avoid, such as convective weather, restricted user airspace or confinement zones associated with highly dynamic trajectories of aircraft, such as UASs, where a specific trajectory may not be known. These more general forms of conflicts may be modeled as 4-dimensional polytopes (4-dimensional versions of polyhedra), or probabilistic 4-D polytopes matching the appropriate format handled by the conflict detection module 170 in the sense-and-avoid subsystem 168. In certain embodiments, the trajectory prediction functionality provided by module 164 improves the quality of its prediction as the confidence and number of sources used for trajectory prediction increases. Conversely, predictions based on a minimal set of inputs, for instance based only on the on-board sensor suite 162, may be considered to have a larger associated uncertainty.

The 4-D trajectory of the aircraft 100 itself may be generated by components of a flight management system 180 associated with aircraft 100. The flight management system 180 may include modules such as a trajectory synchronization module 182 and a trajectory negotiation module 184 which both facilitate trajectory-based operations. In addition, the flight management system 180 may include a trajectory planning module 186 and a trajectory prediction module 188 which, in certain embodiments, predicts the 4-D trajectory of the aircraft 100 itself and provides this predicted 4-D trajectory 192 to a conflict detection module 170 of the sense-and-avoid subsystem 168 discussed herein. Trajectory planning is executed in the flight management system 180 using a number of inputs such as: flight plan, performance parameters, navigation parameters, conflict resolution, and so forth. One of the functions of the flight management system 180 is guiding the aircraft 100 along the trajectory 192 generated in the planning process. In other implementations, trajectory planning and/or prediction may be performed by ground-based air traffic management and provided to the flight management system 180 via the appropriate communication link 110.

Instructions or commands generated by the flight management system 180 may be implemented at the flight control system 190. In certain embodiments, the flight control system 190 refers to the low level control system (e.g., autopilot), which directs the aircraft's control surfaces to achieve flight modes appropriate to every flight phase and aircraft configuration, according to what the flight management system 180 determines. In certain implementations, the collision avoidance function discussed herein may take control of the flight control system 190 when needed.

The depicted trajectory-based sense-and-avoid system also includes a sense-and-avoid subsystem 168. In the depicted embodiment, the sense-and-avoid subsystem 168 provides multi-layer functionality, with each layer acting in different time horizons, such as the strategic planning, tactical separation, and collision avoidance layers depicted in FIG. 3. For example, one layer of functionality may be a separation management layer that acts to maintain adequate separation between the aircraft 100 and other aircraft. In the depicted embodiment, the separation management layer is implemented via a conflict detection module 170 and a conflict resolution module 172. In such an embodiment, the conflict detection module 170 may receive as inputs the synchronized 4-D constructs 166 provided by air traffic control 108 and/or by the trajectory prediction module 164 and the 4-D trajectory 192 of the aircraft itself. These synchronized 4-D trajectories and/or polytopes (i.e., constructs) may be conflict probed by the conflict detection module 170 and any potential conflicts may be provided as inputs to the conflict resolution module 172, which in turn may provide recommendations or instructions to the flight management system 180 so that the 4-D trajectory of the aircraft 100 may be altered to maintain suitable separation from the potential conflict. Thus, the separation management layer works in conjunction with the flight management system 180, which considers the conflict resolution outputs of the conflict resolution module 172 in the trajectory planning process.

Thus, in one such implementation the separation management layer acts to prevent the 4-D trajectory 192 of the aircraft 100 from violating the protected airspace zone of other aircraft or to prevent the 4-D trajectory 192 of the aircraft 100 from getting too close to restricted airspace, a region of inclement weather, or a region susceptible to poor communications or communications interference. In this way, the separation management layer acts to ensure that the 4-D trajectory 192 generated by the flight management system 180 is free of conflict.

Another layer of functionality of the depicted sense-and-avoid subsystem 168 is a collision avoidance layer that is implemented via a collision detection module 174 and a collision resolution module 176. In one such implementation, the collision avoidance layer is activated when other measures to achieve self-separation have failed. In such a case, the need for an urgent collision avoidance maneuver may subsume the flight management function, taking control of the flight control system 190. For example, in the depicted implementation, the collision detection module 174 receives inputs directly from the on-board sensor suite 162. Based upon these inputs, if the collision detection module 174 determines that a collision is possible or likely, appropriate instructions are issued to the collision resolution module 176, which takes control of the flight control system 190 to prevent the collision.

In certain implementations, the logic employed to maintain separation and/or to avoid collisions is time sensitive. In such implementations, different actions or types of information may be associated with different time frames. For example, turning to FIGS. 3 and 4, where a potential violation of minimum separation distance is detected at a long range (such as 10 minutes or more prior to the violation), the resulting action may be deemed strategic trajectory management. While 10 minutes is one example of a time period that may be used to define the boundary of strategic trajectory management, in other implementations this boundary may be defined by other time periods and/or may be determined based on various other factors, such as the speed and/or maneuverability of the aircraft in question. In one example, the information typically relied upon in determining the possibility of a conflict (e.g., a violation of a specified separation distance) is typically based upon information that is outside the range of the on-board sensor suite 162. For example, such strategic information may include all 4-D constructs 166 generated from the data obtained from the air traffic management infrastructure (i.e., air traffic control 108) and/or the ground control station 102 (in embodiments where the aircraft 100 is a UAS). In certain embodiments, the 4-D trajectory data is obtained directly from the air traffic control communications (i.e., air traffic control provides the 4-D trajectories of all nearby aircraft). In such embodiments, the on-board trajectory prediction module 164 may not be utilized to estimate 4-D trajectory data as the needed 4-D trajectory data already exists in a form usable by the conflict detection module 170.

In a strategic trajectory management situation, the conflict detection module 170 and conflict resolution module 172 may communicate the potential conflict and, in certain implementations, the corrective action to be taken, to the flight management system 180. In certain embodiments, the flight management system 180 may communicate the potential conflict to air traffic control 108, which may in turn generate appropriate instructions to and course corrections to avoid the potential conflict. In other embodiments, the flight management system 180 may itself, via the trajectory planning module 186 and trajectory prediction module 188, generate a new, deconflicting 4-D trajectory 192 for the aircraft 100 which satisfies the constraints of the conflict probe administered by the conflict detection module 170. The new 4-D trajectory 192 may then be communicated to air traffic control 108 for trajectory synchronization purposes or eventually, to trigger a trajectory negotiation process if the proposed trajectory corrections are not acceptable to air traffic control.

Figure 3:
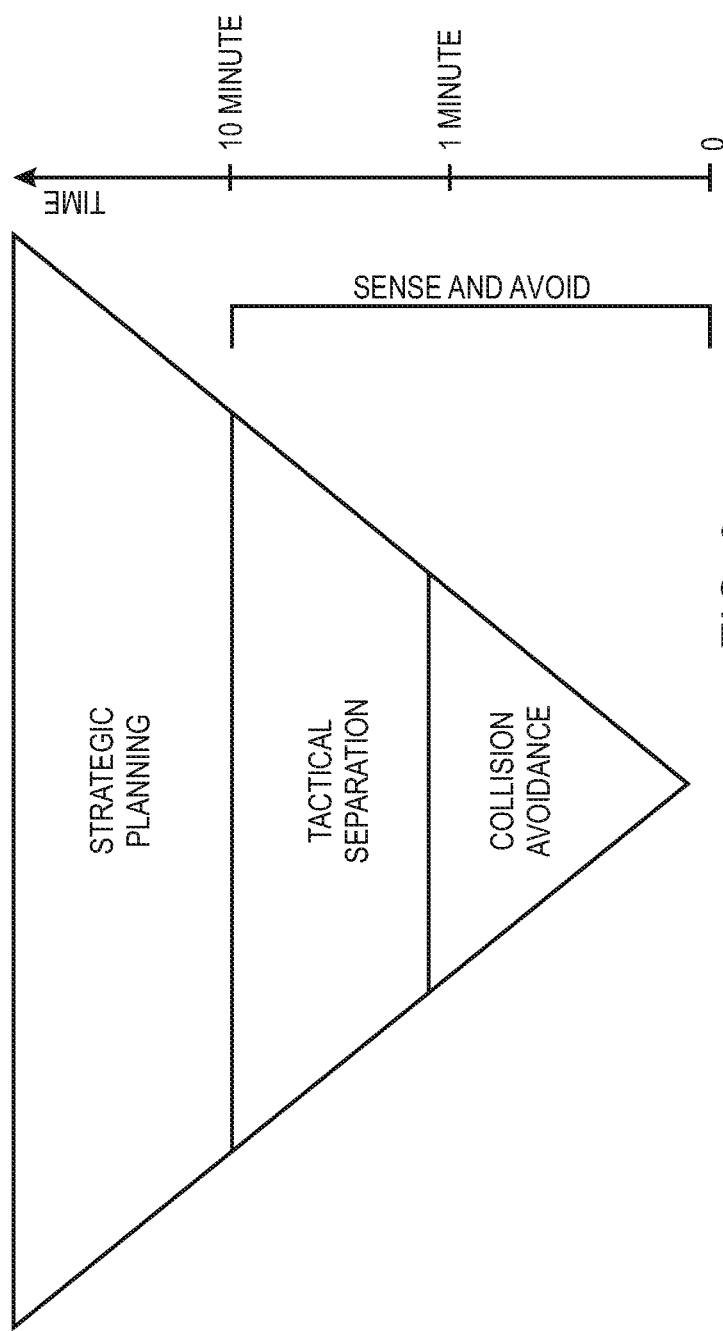
FIG. 3 provides a graphical depiction of different temporal domains and their relationship to the use of a trajectory-based sense-and-avoid system, in accordance with aspects of the present disclosure
Figure 4:
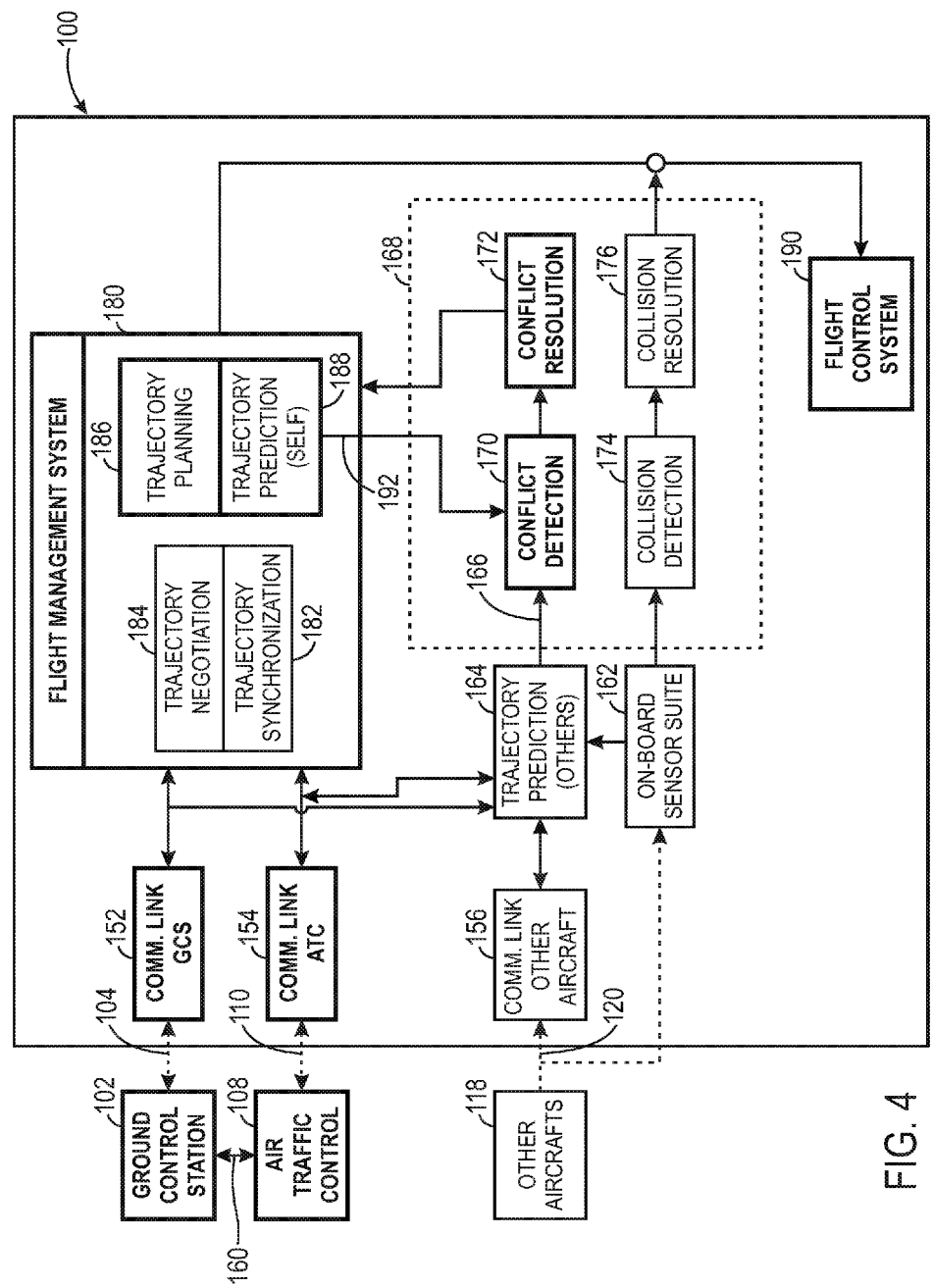
FIG. 4 depicts one implementation of a trajectory-based sense-and-avoid system engaged in maintaining strategic separation with other aircraft, in accordance with aspects of the present disclosure.
Figure 5:
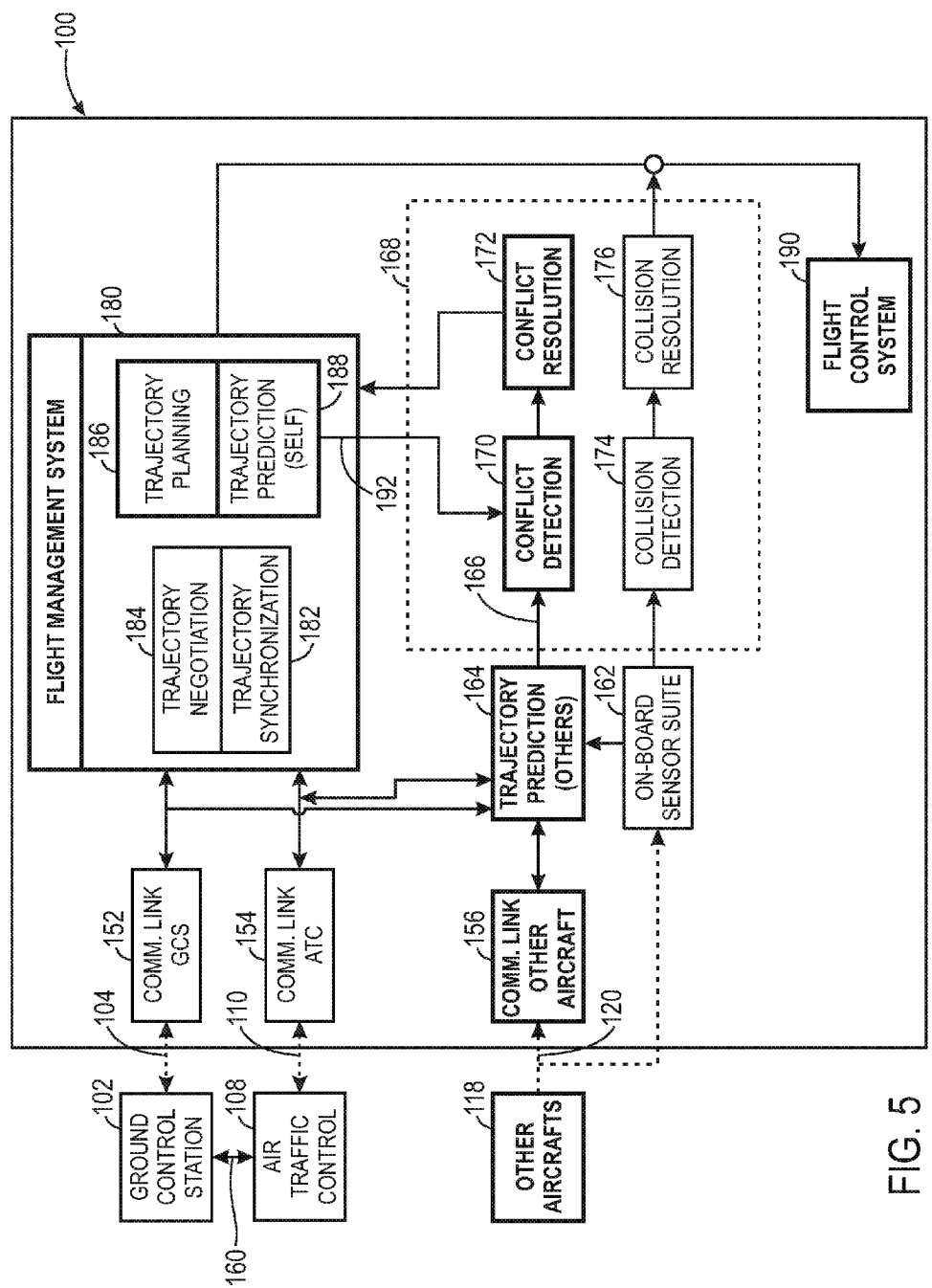
FIG. 5 depicts one implementation of a trajectory-based sense-and-avoid system engaged in maintaining tactical separation and/or avoidance with other aircraft, in accordance with aspects of the present disclosure.

Turning to FIGS. 3 and 5, in a tactical separation management example, the time frame to resolve the potential conflict is less, such as between one minute and ten minutes. As with strategic trajectory management, the actual time interval defining tactical separation management may vary and/or may be determined based on various factors, such as the speed and/or maneuverability of the aircraft in question, effective sensor range, and so forth. For the distances involved in a tactical separation situation, data acquired by the on-board sensor suite 162 and/or the air-to-air communications from other aircraft 118 may be used in calculating the 4-D trajectories 166 used to make conflict determinations. In one embodiment, the 4-D trajectories estimated based on the data provided by other aircraft 118 or by the on-board sensor suite 162 may be fused with the air traffic management 4-D trajectory data to improve the quality of the data (e.g., to lower false positives). This 4-D trajectory data 166 based on the combined information may be used by both the on-board sense-and-avoid subsystem 168 and/or sent back to the ground air traffic control system 108.

In one implementation of tactical separation management, the conflict detection module 170 and conflict resolution module 172 may communicate the potential conflict, and the corrective action to be taken, to the flight management system 180. The flight management system 180 in turn, via the trajectory planning module 186 and trajectory prediction module 188, generates a new, deconflicting 4-D trajectory 192 for the aircraft 100 which satisfies the constraints of the conflict probe administered by the conflict detection module 170. The new 4-D trajectory 192 may then be communicated to air traffic control 108 for synching or negotiation purposes.

Figure 6:
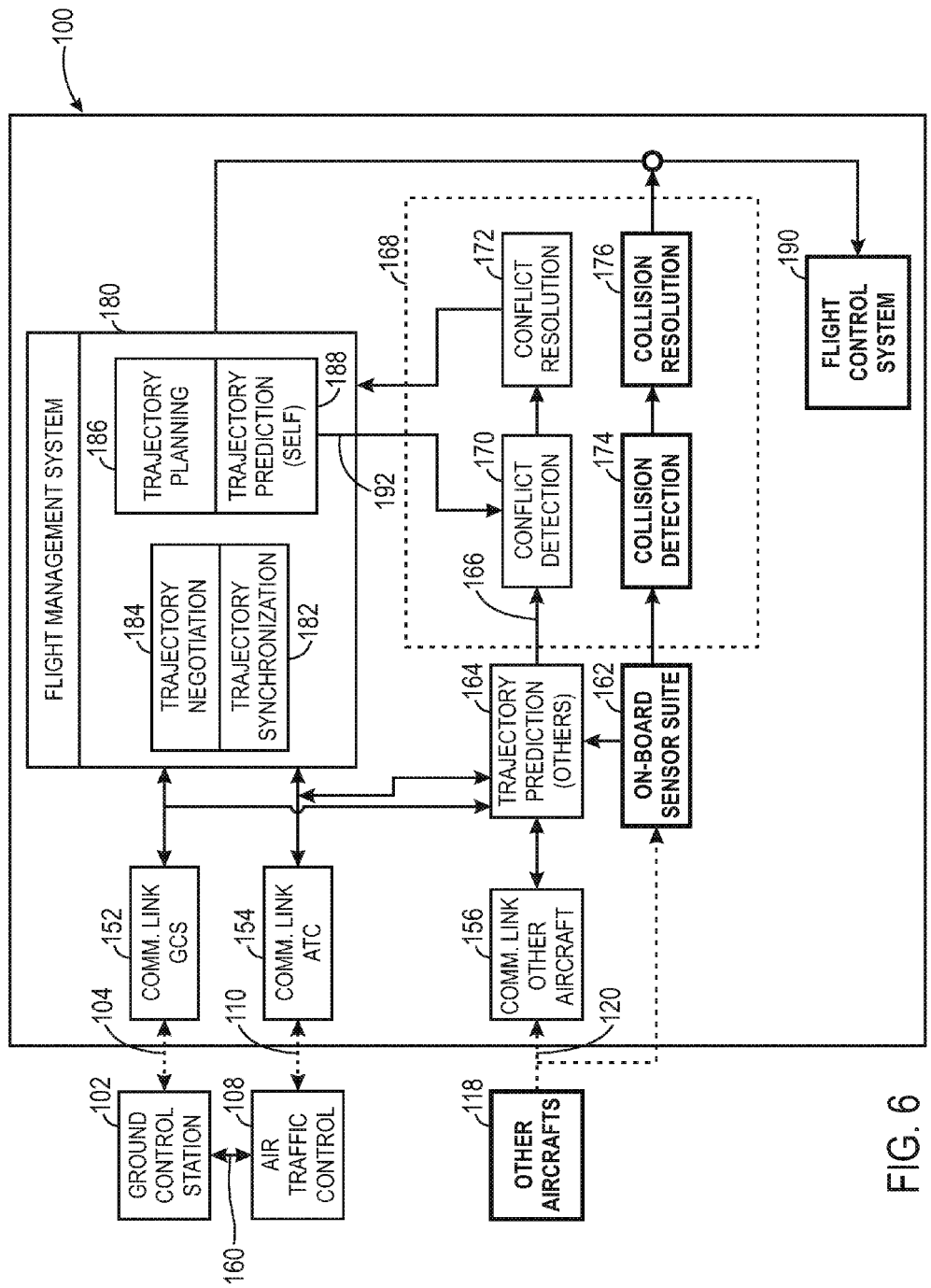
FIG. 6 depicts one implementation of a trajectory-based sense-and-avoid system engaged in collision avoidance, in accordance with aspects of the present disclosure.

Turning to FIGS. 3 and 6, in one implementation, if the time frame of the conflict reaches a critical emergency time frame (e.g., less than one minute), the 4-D trajectory-based collision avoidance function takes over to resolve the conflict. As will be appreciated, the actual time-frame within which a conflict is deemed to be an emergency may vary for different aircraft, such as based upon the protected airspace zone defined for the aircraft and/or based upon the speed and/or maneuverability of the aircraft. In one such example, the data relied upon is derived entirely from the on-board sensor suite 162, though, if available, intent communications from cooperative aircraft may also be utilized. In one example, where a collision is determined to be imminent based at least on the on-board sensor data provided to the collision detection module 174, trajectory data from the collision detection module 174 may be provided directly to a collision resolution module 176. In this example, the collision resolution module 176 in turn generates takes temporary control of the flight control system 190 from the flight management system 180 to implement the necessary collision avoidance maneuvers. Once the collision is avoided, control is returned to the flight management system 180.

While the foregoing covers certain aspects of trajectory-based sense-and-avoid as it pertains to collision avoidance, other issues related to trajectory planning may also be encompassed in trajectory-based operations. For example, in implementations where the aircraft 100 is uninhabited, loss of communications with the aircraft is typically not desired. In such instances, the probability of loss of communication links with the aircraft may be reduced by making communication coverage (e.g., link availability) an explicit criterion in the trajectory planning, separation, and avoidance algorithms.

For example, in trajectory planning an additional constraint of availability of communication link between the aircraft and the ground control station 102 and/or air traffic control 108 may be employed. In one such example, the planned airspace that will be traveled may be partitioned into sub-volumes which each have an associated probability of communication quality or success, thereby creating a communication availability map. The planned trajectory of the aircraft 100 (an uninhabited aerial vehicle in this example) may then take into account communication availability in the trajectory planning process. Further, in instances where communications are lost or degraded, the aircraft 100 may implement a trajectory change, based on the communication availability map, to maneuver the aircraft 100 to the nearest high probability communication point along the planned route. In this manner, successful communication link availability may be emphasized while still minimizing deviation from the initial or planned trajectory.

Similarly, the trajectory planning algorithms may take in to account weather conditions that may affect communication quality in generating a trajectory for an aircraft 100, such a UAS. For example, bad weather that might adversely affect communications may justify a planned trajectory or a trajectory change that avoids the bad weather and maintains a high probability of continued communication with the aircraft 100. In this manner, weather forecasts and patterns may be incorporated into trajectory planning in order to maintain communications.

With the preceding discussion in mind, the following examples are provided by way of further illustrating aspects of the present trajectory-based sense-and-avoid approach. In the first example, a UAS is to be delivered to an operation site from a manufacturing facility. In this example, the reliance on a sense-and-avoid capability, which is tactical in nature, can be minimized or eliminated for UAS operations by shifting focus to trajectory-based management in the strategic time horizon. In particular, this example relates to a trajectory-based sense-and-avoid implementation that incorporates fusion of advanced 4D trajectory synchronization, negotiation mechanisms, and an on-board sensor suite.

In this first example, an operating agency creates and files a flight plan for a UAS. The filed flight plan is approved and results in the set of Temporary Flight Restrictions (TFR) established around the departure and arrival points of the UAS route and distributed through NOTAMS. The UAS takes off under the trajectory-based sense-and-avoid support. The UAS climbs to 18,000 feet. During the climb, the Class A airspace portion of the trajectory is negotiated by the UAS and air traffic control 108 taking into account other traffic in the vicinity of the requested UAS trajectory. From this point on, the UAS trajectory does not differ from the typical commercial airplane trajectory. Trajectory synchronization guarantees that air traffic control 108 has situational awareness of the UAS's 4D-trajectory and intent. Both trajectory synchronization and trajectory negotiation are enabling mechanisms for the UAS in the Class A airspace operation. In this example, an ADS-B system shows an aircraft projected to be at a distance less than the minimum separation in 9 minutes. An on-board strategic separation algorithm is activated on the UAS, resulting in a new proposed trajectory being generated and communicated to air traffic control 108. Upon approval from air traffic control, the new trajectory is synched with the on-board flight management system. As the UAS approaches the end of its Class A airspace trajectory segment, descent is initiated and the landing at the destination airport is completed.

In a second example, a potential surveillance implementation is described. In this example, unlike the first example where a point-to-point travel scenario is envisioned, the UAS operation is less likely to involve trajectories like those of a commercial aircraft. In this example, the UAS flies loitering patterns between 500 and 18,000 feet that are repeatedly re-negotiated with air traffic control services 108. Trajectory synchronization is engaged to give air traffic control 108 accurate positions of the UAS. Trajectory is negotiated by the UAS based on its strategic and tactical mission needs as well as performance limitations and threat priorities. Under normal circumstances, commercial air traffic remains largely unaffected by the presence of the UAS because the UAS adapts its loitering patterns to accommodate commercial traffic and be unobtrusive.

However, in this example, the situation reverses if a high priority subject is detected. In such an event, commercial traffic routes will be re-negotiated by air traffic control 108 to give way to the high priority UAS trajectory. Similar situations may occur in the case of UAS malfunction when an immediate emergency landing is required. Likewise, in a corresponding situation may occur when the aircraft in question is a manned aircraft with a reduced crew (e.g., a single pilot). Such an aircraft essentially becomes a UAS in case when a pilot becomes physically incapacitated.

Returning to the UAS surveillance scenario, the UAS may initially negotiate with air traffic control 108 regarding a proposed loitering pattern. In this example, traffic in the airspace is low and UAS loitering pattern is approved. While en route, on-board sensors 162 detect an approaching object with a collision estimate of less than two minutes. The on-board tactical separation algorithm is activated and the on-board flight management system 180 generates a trajectory to avoid collision. Based on the new trajectory, the UAS changes trajectory to avoid collision. After collision avoidance is achieved, the UAS communicates its new trajectory to air traffic control 108 and the on-board flight management system 180 generates a trajectory to get back into original planned trajectory with minimum deviation.

Continuing this example, while en route, communication with ground control 102 (pilot in the loop) is lost. Based on this loss of communication, the UAS flies to a predefined location where the probability of a successful communication link is high and loiters until a communication link is restored. If a communication link is restored, the UAS continues to its planned trajectory with minimum deviation from original trajectory and maximum probability of successful communication link. However, if the communication link is not restored, the UAS autonomously lands and is given right of way among neighboring traffic. In accordance with other examples, upon loss of communication the UAS instead may continue on the last approved flight plan and air traffic control may route other aircraft around the out of communication UAS until communication is restored.

Technical effects of the invention include an aircraft, such as a UAS or reduced crew aircraft, configured to maintain separation with other aircraft using on-board analysis of 4-D trajectories. The trajectories may be provided by an outside source, such as an air traffic control system, or generated by on-board system, such as a trajectory predictor module and/or a flight management system. Technical effects of the invention also include an aircraft, such as a UAS or reduced crew aircraft, configured to maintain avoid collision using on-board analysis of 4-D trajectories. The trajectories may be provided by an outside source, such as an air traffic control system, or generated by on-board system, such as a trajectory predictor module and/or a flight management system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A sense-and-avoid system, comprising:
   an on-board sensor suite configured to detect flight obstacles;
   a processor configured to execute one or more stored routines, wherein the one or more stored routines, comprise:
      a conflict detection routine which, when executed, receives a four-dimensional (4-D) trajectory of an aircraft and 4-D constructs representing trajectories of other aircraft or regions from which the aircraft is to maintain separation, wherein the conflict detection module determines if a conflict exists between the 4-D trajectory of the aircraft and the 4-D constructs;
      a conflict resolution routine which, when executed, receives information from the conflict detection module, wherein the conflict resolution module generates a change to the 4-D trajectory of the aircraft to avoid the conflict; and
      a trajectory prediction routine which, when executed, receives inputs from both external communications links and the on-board sensor suite, predicts the position and shape of the 4-D constructs representing the trajectories of other aircraft over time based on data derived from one or both of the external communication links and the on-board sensor suite, and bases an uncertainty associated with each predicted 4-D construct representing the trajectory of other aircraft on a number of sources of data used in predicting a respective 4-D construct and a confidence associated with each source of data used in predicting the respective 4-D construct.

2. The sense-and-avoid system of claim 1, wherein the 4-D trajectory of the aircraft is provided to the conflict detection module by a flight management system of the aircraft.

3. The sense-and-avoid system of claim 1, wherein the 4-D constructs are provided by a source external to the aircraft.

4. The sense-and-avoid system of claim 1, wherein the external communications links are to one or more of an air traffic control system, other aircraft, or a ground control station.

5. The sense-and-avoid system of claim 1, wherein the conflict resolution module communicates the change to a flight management system to modify the 4-D trajectory of the aircraft.

6. The sense-and-avoid system of claim 1, comprising:
   a collision detection module configured to detect a potential collision of the aircraft based on data provided at least by a sensor suite of the aircraft; and
   a collision resolution module configured to receive notification of the potential collision from the collision detection module and to issue instructions directly to a flight control system to avoid the potential collision.

7. The sense-and-avoid system of claim 6, wherein the operation of the conflict detection module, the conflict resolution module, the collision detection module, and the collision resolution module depend on a time frame identified for the conflict or potential collision.

8. The sense-and-avoid system of claim 7, wherein conflicts or potential collisions determined to be outside an emergency time frame are handled by the conflict detection module and the conflict resolution module and wherein conflicts or potential collisions determined to be within the emergency time frame are handled by the collision detection module and the collision resolution module.

9. The sense-and-avoid system of claim 1, wherein the aircraft is directed to fly to a predefined location where probability of a successful communication reconnection is high, in the case of a communication disconnection of the external communication links.

10. A sense-and-avoid system installed on an aircraft, the sense-and-avoid system comprising:
    one or more communication links configured to communicate with one or more of a ground control station, an air traffic control system, or other aircraft;
    a sensor suite;
    a trajectory predictor module configured to generate four-dimensional (4-D) constructs based on the data received from the one or more communication links and the sensor suite;
    a flight management system comprising a trajectory planning module and a trajectory prediction module, wherein the trajectory prediction module generates a 4-D trajectory for the aircraft;
    a flight control system in communication with the flight management system and configured to execute instructions from the flight management system to cause the aircraft to fly along the 4-D trajectory;
    a conflict detection module configured to evaluate the 4-D trajectory for the aircraft and selected 4-D constructs to determine the presence of a conflict between the 4-D trajectory and one or more of the selected 4-D constructs, wherein the selected 4-D constructs are provided only by one or more of the ground control station and the air traffic control system if the conflict is estimated to occur in a strategic time frame, and the selected 4-D constructs are provided at least in part by the trajectory predictor module if the conflict is estimated to occur in a tactical time frame; and
    a conflict resolution module configured to generate a change to the 4-D trajectory in the event of a conflict and to communicate the change to the flight management system to update the 4-D trajectory to alleviate the conflict.

11. The sense-and-avoid system of claim 10, wherein one of the one or more communication links communicates with other aircraft to exchange Traffic Collision Avoidance System (TCAS) or Automatic Dependent Surveillance-Broadcast (ADS-B) information.

12. The sense-and-avoid system of claim 10, wherein the aircraft is an unmanned aerial system.

13. The sense-and-avoid system of claim 10, wherein the sensor suite comprises one or more of a radar, a ladar, an infrared system, a video system, or navigation and guidance sensors.

14. The sense-and-avoid system of claim 10, wherein the selected 4-D constructs comprise one or more of 4-D trajectories of other aircraft, 4-D polytopes of restricted airspace, 4-D polytopes representing a weather condition, or 4-D polytopes representing communication quality.

15. The sense-and-avoid system of claim 10, comprising:
    a collision detection module configured to receive data from the sensor suite and to generate a collision notification if a potential collision is expected within a critical time frame; and
    a collision resolution module configured to receive the collision notification and to directly control the flight control system to avoid the potential collision.

16. The sense-and-avoid system of claim 10, wherein information generated by one or more of the trajectory predictor module, the flight management system, the conflict detection module, or the conflict resolution module is communicated to the ground control station or the air traffic control system.

17. An aircraft, comprising:
    a trajectory-based sense-and-avoid system configured to detect potential conflicts or collisions based on 4-D trajectories, 4-D constructs, data generated by an on-board sensor suite, or a combination thereof;
    wherein potential conflicts or collisions estimated to occur in a strategic time frame are identified using a 4-D trajectory of the aircraft generated by a flight management system of the aircraft and 4-D constructs provided only by a source external to the aircraft;
    wherein potential conflicts or collisions estimated to occur in a tactical time frame are identified using the 4-D trajectory of the aircraft generated by the flight management system of the aircraft and 4-D constructs, at least a portion of which are generated by a predictor module on-board the aircraft; and
    wherein potential conflicts or collisions estimated to occur in a critical time frame are identified based at least in part on the data generated by the on-board sensor suite.

18. The aircraft of claim 17, wherein the strategic time frame is ten minutes or greater, the tactical time frame is between one and ten minutes, and the critical time frame is one minute or less.

19. The aircraft of claim 17, wherein potential conflicts or collisions estimated to occur in the strategic time frame or the tactical time frame are avoided by determining a change to the 4-D trajectory of the aircraft and implementing the change to the 4-D trajectory using the flight management system.

20. The aircraft of claim 17, wherein potential conflicts or collisions estimated to occur in the critical time frame are avoided by a collision resolution module taking direct control of a flight control system so as to avoid the potential conflicts or collisions.

21. The sense-and-avoid system of claim 9, wherein the aircraft automatically lands if a successful communication reconnection cannot be restored.

* * * * *